United States Patent
Kreis et al.

(10) Patent No.: US 12,192,547 B2
(45) Date of Patent: Jan. 7, 2025

(54) HIGH-RESOLUTION VIDEO GENERATION USING IMAGE DIFFUSION MODELS

(71) Applicant: NVIDIA Corporation, Santa Clara, CA (US)

(72) Inventors: Karsten Julian Kreis, Vancouver (CA); Robin Rombach, Heidelberg (DE); Andreas Blattmann, Waldkirch (DE); Seung Wook Kim, Toronto (CA); Huan Ling, Toronto (CA); Sanja Fidler, Toronto (CA); Tim Dockhorn, Waterloo (CA)

(73) Assignee: NVIDIA Corporation, Santa Clara, CA (US)

( * ) Notice: Subject to any disclaimer, the term of this patent is extended or adjusted under 35 U.S.C. 154(b) by 112 days.

(21) Appl. No.: 18/181,729

(22) Filed: Mar. 10, 2023

(65) Prior Publication Data

US 2024/0171788 A1 May 23, 2024

Related U.S. Application Data

(60) Provisional application No. 63/426,037, filed on Nov. 16, 2022.

(51) Int. Cl.
| | |
|---|---|
| *H04N 21/2343* | (2011.01) |
| *G06T 9/00* | (2006.01) |
| *G06V 10/24* | (2022.01) |
| *G06V 10/25* | (2022.01) |
| *G06V 10/82* | (2022.01) |
| *H04N 7/01* | (2006.01) |

(52) U.S. Cl.
CPC ....... *H04N 21/234363* (2013.01); *G06T 9/00* (2013.01); *G06V 10/24* (2022.01); *G06V 10/25* (2022.01); *G06V 10/82* (2022.01); *H04N 7/0117* (2013.01)

(58) Field of Classification Search
CPC .......... H04N 21/234363; H04N 7/0117; G06T 9/00; G06V 10/24; G06V 10/25; G06V 10/82
See application file for complete search history.

(56) References Cited

U.S. PATENT DOCUMENTS

| | | | | |
|---|---|---|---|---|
| 11,335,048 | B1* | 5/2022 | Lee | G06T 11/60 |
| 11,436,787 | B2* | 9/2022 | Wang | G06F 3/013 |
| 2021/0366082 | A1* | 11/2021 | Xiao | G06T 11/00 |

(Continued)

OTHER PUBLICATIONS

D. Zhou et al., "MagicVideo: Efficient Video Generation With Latent Diffusion Models," arXiv, Nov. 20, 2022, https://arxiv.org/abs/2211.11018.

(Continued)

*Primary Examiner* — Oschta I Montoya
(74) *Attorney, Agent, or Firm* — Foley & Lardner LLP

(57) ABSTRACT

In various examples, systems and methods are disclosed relating to aligning images into frames of a first video using at least one first temporal attention layer of a neural network model. The first video has a first spatial resolution. A second video having a second spatial resolution is generated by up-sampling the first video using at least one second temporal attention layer of an up-sampler neural network model, wherein the second spatial resolution is higher than the first spatial resolution.

16 Claims, 8 Drawing Sheets

(56) References Cited

U.S. PATENT DOCUMENTS

2023/0351558 A1* 11/2023 Chen .................. G06T 5/60

OTHER PUBLICATIONS

T. Hoppe et al., "Diffusion Models for Video Prediction and Infilling," Published in Transactions on Machine Learning Research, Nov. 14, 2022, https://arxiv.org/abs/2206.07696.
U. Singer et al., "Make-A-Video: Text-to-Video Generation without Text-Video Data," arXiv, Sep. 29, 2022, https://makeavideo.studio/.
V. Voleti et al., "MCVD: Masked Conditional Video Diffusion for Prediction, Generation, and Interpolation," Mila, University of Montreal, Canada, Oct. 12, 2022, https://arxiv.org/abs/2205.09853.
W. Harvey et al., "Flexible Diffusion Modeling of Long Videos," Department of Computer Science, University of British Columbia, Vancouver, Canada, Sep. 15, 2022, https://arxiv.org/abs/2205.11495.

* cited by examiner

HIGH-RESOLUTION VIDEO GENERATION USING IMAGE DIFFUSION MODELS

CROSS-REFERENCE TO RELATED APPLICATIONS

The present application claims priority to U.S. Provisional Patent Application No. 63/426,037, filed Nov. 16, 2022, the disclosure of which is incorporated herein by reference in its entirety.

BACKGROUND

Conventional Artificial Intelligence (AI) models for generating or synthesizing videos include diffusion models, transformer-based models (e.g., CogVideo), and Generative Adversarial Networks (GAN), etc. Conventional AI models are typically not scalable for generating high-resolution videos, are unable to generate diverse and challenging content, and require a large amount of training data. It is computationally expensive to scale conventional diffusion models for video generation to generate high-resolution videos given that such models are configured to generate videos directly at the target resolution. Thus, conventional diffusion models can generate videos at low or medium resolutions. Some conventional models require a large amount of video data for training, thus having low training efficiency. Transformer-based models such as CogVideo include image generators converted into video generators and rely on autoregressive masking for fine-tuning the image generator for video generation. However, the reliance on autoregressive masking poses challenges in scalability at high resolution. Likewise, due to the difficulty in obtaining sufficiently large amounts of training data, GAN-based video synthesis techniques are difficult to scale for diverse and challenging data. GANs are also difficult to train for generating complex, multi-object, high-resolution videos.

SUMMARY

Embodiments of the present disclosure relate to processors, systems, and methods for generating or synthesizing high-spatial resolution, high-temporal resolution (e.g., high frame rate or high Frames Per Second (FPS)), long videos. One or more neural network models described herein can control the generation of videos based on conditioning. For example, an image diffusion model (e.g., a Latent Diffusion Model (LDM)) pre-trained on image data can be converted into a video generator by introducing a temporal dimension to a latent space of the image diffusion model. The video generator can be fine-tuned using encoded image sequences or video data. The video generator can generate a low-spatial resolution video. Pixel-space diffusion model up-samplers (e.g., a diffusion-based image super-resolution model) can be converted into temporally consistent video super-resolution models (e.g., a diffusion-based video super-resolution model). The video super-resolution models can generate a high-spatial-resolution video using the low-spatial resolution video.

At least one aspect relates to a processor. The processor can include one or more circuits to align a plurality of images into frames of a first video using at least one first temporal attention layer of a neural network model, the first video having a first spatial resolution. The one or more circuits can generate a second video having a second spatial resolution by up-sampling the first video using at least one second temporal attention layer of an up-sampler neural network model, the second spatial resolution being higher than the first spatial resolution.

The neural network model is modified from an image diffusion model by adding the at least one first temporal attention layer into the image diffusion model. In one or more embodiments, the image diffusion model may be implemented as an LDM that includes an encoder to map an input from an image space to a latent space and a decoder to map latent encoding from the latent space to the image space. The decoder is updated according to temporal incoherencies in mapping the latent encoding from the latent space to the image space.

The up-sampler neural network model includes a first diffusion model (e.g., a diffusion-based video super-resolution model) for video generation. The first diffusion model is modified from a second diffusion model (e.g., the diffusion-based image super-resolution model) for image generation, by adding the at least one second temporal attention layer into the first diffusion model for image generation. The plurality of images are consecutive frames of the first video.

In some embodiments, the neural network model includes a first diffusion model and a second diffusion model. The first diffusion model (e.g., a key frame LDM) is to generate a third video (e.g., including sparse key frames). The second diffusion model (e.g., an interpolation LDM) is to generate the first video by generating at least one frame between two consecutive frames of the third video.

In some embodiments, the neural network model is to generate a third video and the first video by generating at least one frame between two consecutive frames of the third video according to relative time step embedding.

In some examples, the first video is generated according to at least one of one or more text prompts, one or more bounding boxes, or one or more conditioning signals.

At least one aspect relates to a processor. The processor can include one or more circuits to update a neural network model to align a plurality of images into frames of a first video by updating at least one first temporal attention layer of the neural network model, the first video having a first spatial resolution. The one or more circuits can update an up-sampler neural network model to generate a second video having a second spatial resolution via up-sampling the first video, by updating at least one second temporal attention layer of the up-sampler neural network model. In one or more embodiments, the second spatial resolution is higher than the first spatial resolution.

The one or more circuits are to insert the at least one first temporal attention neural network layer into a denoising neural network of an image diffusion model and update the at least one first temporal attention neural network layer to align the plurality of images into the frames of the first video.

The one or more circuits are to update at least one spatial layer of the neural network model using a plurality of sample images and update the at least one first temporal attention layer using at least one sample sequence of images—while maintaining parameters of the at least one spatial layer unchanged.

The neural network model is an LDM including an encoder to map an input from an image space to a latent space and a decoder to map latent encoding from the latent space to the image space. In one or more embodiments, updating the video diffusion model includes updating the decoder according to temporal incoherencies in mapping the latent encoding from the latent space to the image space. In some embodiments, the plurality of images are consecutive frames of the first video.

In some embodiments, the neural network model includes a first diffusion model and a second diffusion model. The first diffusion model (e.g., a key frame LDM) is to generate a third video (e.g., including sparse key frames). The second diffusion model (e.g., an interpolation LDM) is to generate the first video by generating at least one frame between two consecutive frames of the third video.

In some examples, the neural network model is updated to generate a third video. The neural network model is updated to generate the first video by generating at least one frame between two consecutive frames of the third video according to relative time step embedding.

The one or more circuits are to update the neural network model to generate the first video according to at least one of text prompts, bounding boxes, or conditioning signals. The one or more circuits are to update the neural network model to generate the first video according to modified conditioning signals for classifier-free guidance.

At least one aspect of the present disclosure relates to a method. The method can include updating a neural network model to align a plurality of images into frames of a first video by updating at least one first temporal attention layer of the neural network model. The first video has a first spatial resolution. The method further includes updating an up-sampler neural network model to generate a second video having a second spatial resolution via up-sampling the first video, by updating at least one second temporal attention layer of the up-sampler neural network model. The second spatial resolution is higher than the first spatial resolution.

The processors, systems, and/or methods described herein can be implemented by or included in any system that generates a response or output based on input video data, such as at least one of a system associated with an autonomous or semi-autonomous machine (e.g., an AI driver, an in-vehicle infotainment system, and so on); a system for text-to-video modeling, a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for generating or presenting virtual reality (VR) content, augmented reality (AR) content, and/or mixed reality (MR) content; a system for performing conversational AI operations; a system for generating and using synthetic data; a system incorporating one or more virtual machines (VMs); a system implemented at least partially in a datacenter; or a system implemented at least partially using cloud computing resources.

BRIEF DESCRIPTION OF THE DRAWINGS

The present systems and methods for generating responses from video data for video-based AI systems and applications are described in detail below with reference to the attached drawing figures, wherein.

DETAILED DESCRIPTION

Figure 1:
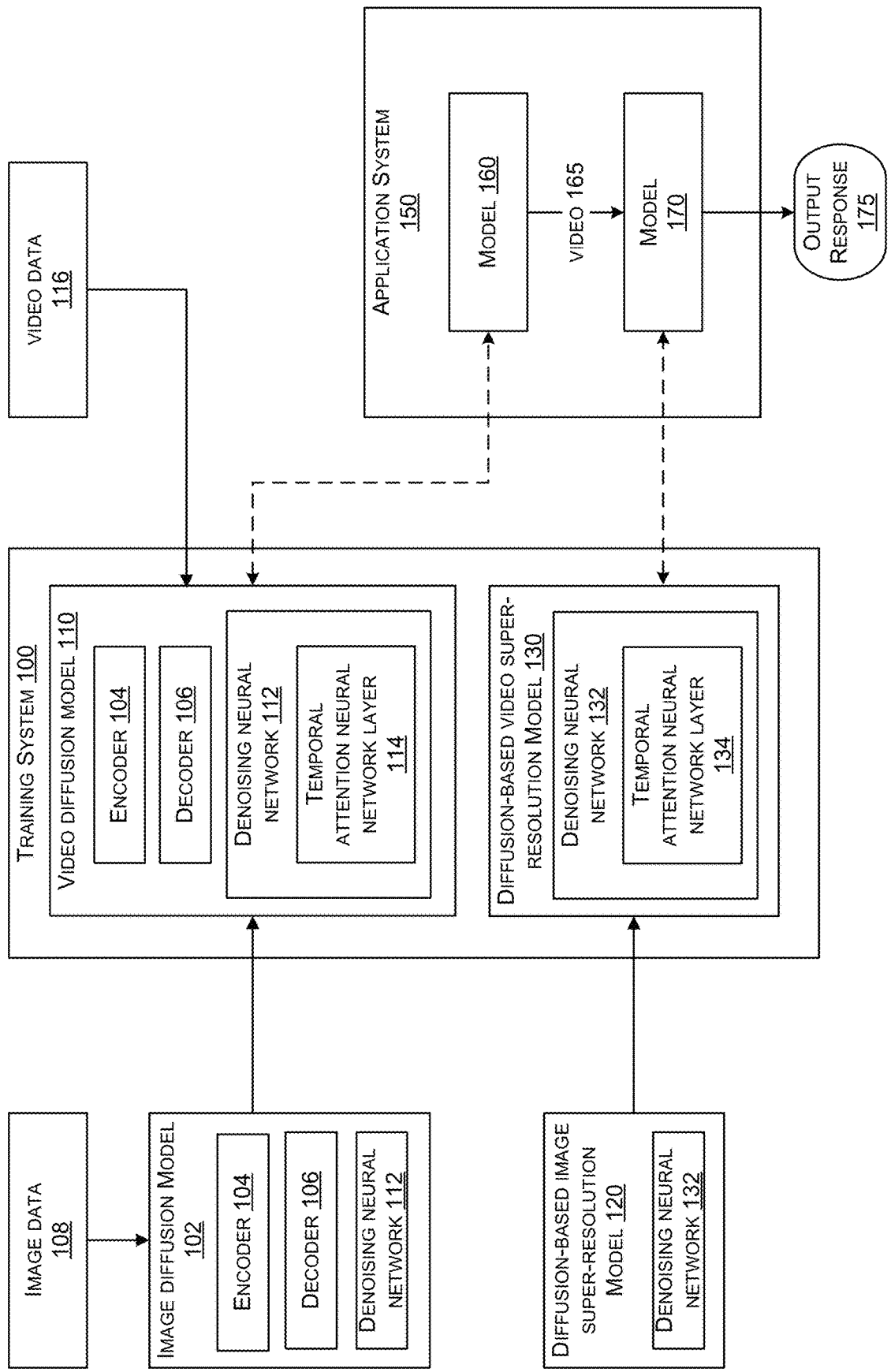
FIG. 1 is a block diagram of an example computing environment for training and operating machine learning models.

Systems and methods are disclosed related to using one or more neural networks or machine learning models (alternatively referred to herein as "models") to generate or synthesize high-resolution, long-term, AI-based videos. The AI-based video generation and synthesis can be based on, for example, text prompts that define the content of the videos, bounding boxes that define a location or area where objects are to be generated, class-like conditions (e.g., day, night, weather, etc.), and so on. The text prompts, bounding boxes, and/or class conditions can be designated based on user input. In some examples, the videos generated using the methods described herein can include synthetic/simulated data that can be used for training an AI-based system for tasks such as autonomous driving.

In some examples, pre-trained image diffusion models can be implemented to perform video fine-tuning efficiently using less video data as compared to conventional models that train using video data directly. For example, the image diffusion models are pre-trained using large-scale image datasets which are abundantly available from various sources and services. Such image datasets and video data used for fine-tuning the image diffusion models as described herein can be in the same domain or in different domains. That is, there can be a domain gap between the image datasets used for pre-training and the video data used for fine-tuning. In some examples, the image diffusion model can include an LDM as the base model, which improves long-term generation (e.g., generation of an extended/long sequence of video frames). Unlike conventional transformer-based models (e.g., CogVideo), the image diffusion models described herein do not rely on autoregressive masking for fine-tuning for video generation and can therefore improve scalability at high resolutions. Unlike GAN-based methods which are limited to simple videos with single objects, the image diffusion models described herein are scalable to diverse, multi-object, complex, and high-resolution videos.

In some embodiments, an image diffusion model (e.g., a base model) that is pre-trained using image datasets can be fine-tuned (e.g., configured, implemented, updated, modified) into a video generator by incorporating/adding/inserting at least one temporal attention neural network layer into at least one denoising neural network of the image diffusion model. The image diffusion model can be any suitable model pre-trained to generate or synthesize images. Once the at least one denoising neural network is updated to include the at least one temporal attention neural network layer, the at least one temporal attention neural network layer of the model referred to as a video diffusion model is updated (e.g., trained) to align multiple images generated by the image diffusion model into frames of a video. In some examples, the at least one temporal attention neural network layer is updated to align multiple images generated by the image diffusion model into consecutive frames of the video. The video diffusion model can generate an initial low-temporal-resolution (or low frame rate, low FPS) video and low-spatial-resolution video (referred to as the first video) that is up-sampled temporally and/or spatially in the manner described herein.

In some examples, the image diffusion model (e.g., the base model) can be an LDM. An LDM can include an encoder (e.g., an encoder neural network) and a decoder (e.g., a decoder neural network). An encoder of the LDM can compress and can maps the input (e.g., an image) from an image or pixel space to a lower dimensional, compressed latent space (e.g., latent tensors, latent representations, and so on) where the diffusion model can be trained more efficiently. A decoder of the LDM can map the latent encoding back to the image space. Accordingly, the diffusion model can be trained in the compressed latent space, which is memory-efficient. The video diffusion model fine-tuned from such an LDM can model an increased number of video frames at the same time given a fixed memory budget as compared to operating in image or pixel space directly, thus facilitating long-term video generation.

In some examples, the decoder of the LDM can be fine-tuned to prevent the decoder from introducing temporal incoherencies when decoding a frame sequence that was generated from the latent space diffusion model.

In some embodiments, a diffusion-based image super-resolution model can be fine-tuned into super-resolution models for video super-resolution by inserting at least one temporal attention neural network layer into at least one denoising neural network of the diffusion-based image super-resolution model. The diffusion-based image super-resolution model can spatially up-sample low-resolution images into high-resolution images. Once the at least one denoising neural network is updated to include the at least one temporal attention neural network layer, the at least one temporal attention neural network layer of the model referred to as a diffusion-based video super-resolution model (e.g., video diffusion up-sampler model) can be updated (e.g., trained) to spatially up-sample the first video into high-spatial-resolution video (referred to as the second video, e.g., with a higher number of video frames as compared to the first video) in a temporally consistent manner. Accordingly, the diffusion-based video super-resolution model combined with the video diffusion model corresponds to cascaded video generation models fine-tuned from cascaded image diffusion models.

In some embodiments, a video can be synthesized in a stage-wise approach. The video diffusion model can include a first video diffusion model and a second video diffusion model. The first video diffusion model can be updated/trained to generate the multiple frames of a video (referred to as the third video) as described, where the multiple frames can be sparse frames of a video. In other words, the first video has a low frame rate, low FPS, or a low temporal resolution. The second video diffusion model can be updated to generate the first video by temporally up-sampling (e.g., frame interpolation) the third video to fill in at least one frame between two consecutive frames of the third video. The stage-wise approach can generate long-term and consistent videos, by generating a low frame-rate video (the third video) of any length first, and adding the intermediate/missing frames subsequently. The resulting video (the first video) can be up-sampled (relative to the third video) in terms of spatial and/or temporally resolution as described.

In some embodiments, the video diffusion model is one model that generates the multiple frames of a video (referred to as the third video) as described, where the multiple frames can be sparse frames of a video. The model can then be updated/trained to generate the first video by temporally up-sampling (e.g., frame interpolation) the third video to fill in at least one frame between two consecutive frames of the third video. For example, the video diffusion model can be explicitly instructed on the frames used for conditioning and the frames to be generated using relative time step embedding (e.g., time in the video). During fine-tuning or updating of the video diffusion model, input videos can be ingested, and frames of the input video can be masked out to update the video diffusion model to learn to generate those missing frames. Different masking can be applied to correspond to different tasks such as in-filling frames or generating long and low frame-rate videos.

In some examples, to generate an arbitrarily long video, the video diffusion model can be iteratively called autoregressively and can generate more new frames while conditioning previously generated frames.

In some examples, different conditioning signals can be applied. The video diffusion model can accept text prompts that describe the desired video content. The video diffusion model can be updated (e.g., video fine-tuned) to text-to-image diffusion models. To generate videos for a particular task (e.g., driving scenarios), generating the videos can be controlled by allowing/specifying/adding bounding boxes for objects in the scene. The video diffusion model can be updated (e.g., trained) to be conditional on global class-like information, e.g., day, night, and so on.

In some embodiments, conditioning the video diffusion model on different condition signals for video frames or low-resolution videos can be performed using classifier-free guidance, which can combine both conditional and unconditional diffusion models to generate outputs that are aligned with the conditioning information.

Accordingly, the diffusion models described herein can synthesize high-resolution videos using the scalable stage-wise, cascaded mechanism that reaches high spatial resolution incrementally, instead of generating directly at the target spatial resolution in conventional diffusion models.

The processors, systems, and/or methods described herein may be used for a variety of purposes related to video-based applications, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, datacenter processing, conversational AI, light transport simulation (e.g., ray-tracing, path tracing, etc.), collaborative content creation for 3D assets, a system for text-to-video modeling, cloud computing and/or any other suitable applications.

Disclosed embodiments may be included in a variety of different systems such as automotive systems (e.g., AI driver, an in-vehicle infotainment system, and so on), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more Virtual Machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example computing environment including a training system 100 and an application system 150 for training and deploying machine learning models, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The training system 100 can train or update one or more machine learning models such as the video diffusion model 110 and the diffusion-based video super-resolution model 130.

The image diffusion model 102 can include one or more neural networks. A neural network can include an input layer, an output layer, and/or one or more intermediate layers, such as hidden layers, which can each have respective nodes. The image diffusion model 102 can include various neural network models, including models that are effective for operating on images. The image diffusion model 102 is any suitable model that is trained on generating or synthesizing images. In some embodiments, the image diffusion model 102 is pre-trained using the image data 108. The image data 108 can be any suitable image dataset including labeled and/or unlabeled image data. In some examples, the image data 108 includes large-scale image datasets (e.g., ImageNet) that are available from various sources and services. The image diffusion model 102 can include an encoder 104, a decoder 106, and/or a denoising neural network 112. In some embodiments, at least one spatial layer of the image diffusion model 102 is updated using a plurality of sample images (e.g., the image data 108). This can be a part of a pre-training process for the image diffusion model 102.

In some examples, the image diffusion model 102 can include an LDM as the base model. An LDM can improve the computational and memory efficiency over pixel-space Diffusion Models (DMs) by first training a compression model to transform input images $x \sim p_{data}$ (e.g., the image data 108) into a spatially lower-dimensional latent space of reduced complexity, from which the original data can be reconstructed at high fidelity. This approach can be implemented with a regularized autoencoder, which reconstructs input images x via an encoder module (e.g., the encoder 104 or an encoder neural network) and a decoder (e.g., the decoder 106 or a decoder neural network). The reconstruction can be represented as:

$$\hat{x}=D(E(x))\approx x \qquad (1).$$

To ensure photorealistic reconstructions, an adversarial objective can be added to the autoencoder training, which is implemented using a patch-based discriminator. A DM can then be trained in the compressed latent space, with x being replaced by its latent representation $z=E(x)z$. This latent space DM can be typically smaller in terms of parameter count and memory consumption compared to corresponding pixel-space DMs of similar performance.

The image diffusion model 102 can learn to model the data distribution x via iterative denoising using a denoising neural network 112 and can be trained (e.g., updated) with denoising score matching. For example, diffused inputs are constructed using samples such as input images x (e.g., the image data 108). A noise schedule is parameterized via a diffusion time over which logarithmic signal-to-noise ratio monotonically decreases. A denoiser model can receive the diffused inputs that are parameterized with learnable parameters and can optimize a denoising score matching objective based on conditioning information (e.g., text prompt), target vector (e.g., random noise), forward diffusion process, reverse generation process, and so on. The input images x are entirely perturbed into a Gaussian random noise over a maximum diffusion time. An iterative generative denoising process that employs the learned denoiser (e.g., the denoising neural network 112) can be initialized from the Gaussian noise to synthesize novel data.

The training system 100 can convert the image diffusion model 102 (e.g., the base model) to a video diffusion model 110. That is, the training system 100 can construct or otherwise arrive at the video diffusion model 110 based on the image diffusion model 102. The video diffusion model 110 can include one or more neural networks. A neural network can include an input layer, an output layer, and/or one or more intermediate layers, such as hidden layers, which can each have respective nodes. The video diffusion model 110 can include various neural network models, including models that are effective for operating on images and aligning images into a video. The image diffusion model 102 includes the encoder 104, the decoder 106, and/or the denoising neural network 112.

In some examples, the training system 100 inserts at least one temporal attention neural network layer 114 into the at least one denoising neural network 112, which is part of the image diffusion model 102. The video diffusion model 110 may include the image diffusion model 102 with the least one temporal attention neural network layer 114 inserted into the at least one denoising neural network 112 and updated in the manner described. The at least one temporal attention neural network layer 114 can be updated/trained to align multiple images generated by the image 15 diffusion model 102 into frames of a video, by, for example, aligning multiple images generated by the image diffusion model 102 into consecutive frames of the video, referred to as the first video. The first video can be an initial low-temporal-resolution (or low frame rate, low FPS) video and low-spatial-resolution video (referred to as the first video) that is up-sampled in the manner described herein.

The training system 100 can train the at least one temporal attention neural network layer 114 by modifying or updating one or more parameters, such as weights and/or biases, of various nodes of the neural network responsive to evaluating candidate outputs of the at least one temporal attention neural network layer 114. The output of the at least one temporal attention neural network layer 114 can be used to evaluate whether the at least one temporal attention neural network layer 114 has been trained/updated sufficiently to satisfy a target performance metric, such as a metric indicative of accuracy of the at least one temporal attention neural network layer 114 in generating outputs. Such evaluation can be performed based on various types of loss. For example, the training system 100 can use a function such as a loss function to evaluate a condition for determining whether the at least one temporal attention neural network layer 114 is configured (sufficiently) to meet the target performance metric. The condition can be a convergence condition, such as a condition that is satisfied responsive to factors such as an output of the function meeting the target performance metric or threshold, a number of training iterations, training of the at least one temporal attention neural network layer 114 converging, or various combinations thereof.

As discussed, the encoder 104 can map an input image (e.g., the image data 108) from an image or pixel space to a lower dimensional, compressed latent space (e.g., latent tensors, latent representations, latent encoding, and so on) where the image diffusion model 102 can be trained more efficiently in terms of power consumption, memory consumption, and/or time. The decoder 106 can map the latent encoding back to the image space. The video diffusion model 110 fine-tuned from the image diffusion model 102 can model/generate/develop an increased number of video frames at the same time given fixed memory budget as compared to operating in image or pixel space directly, thus facilitating long-term video generation.

In some examples, the temporal attention neural network layer 114 can be trained using the video data 116 in the manner described herein. In some examples, the video diffusion model 110 (e.g., the decoder 106) is fine-tuned or updated using video data 116 to prevent the decoder 106 from introducing temporal incoherencies when decoding a frame sequence (e.g., multiple latent tensors, latent representations, latent encoding, and so on corresponding to multiple input images) generated from the latent space. The image data 108 and the video data 116 can be in the same domain in some examples. In some examples, the image data 108 and the video data 116 can be in different domains, or the image data 108 and the video data 116 can have a domain gap.

The training system 100 can train the decoder 106 by modifying or updating one or more parameters, such as weights and/or biases, of various nodes of the neural network responsive to evaluating candidate outputs of the decoder 106. The output of the decoder 106 can be used to evaluate whether the decoder 106 has been trained/updated sufficiently to satisfy a target performance metric, such as a metric indicative of accuracy of the decoder 106 in generating outputs. Such evaluation can be performed based on various types of loss. For example, the training system 100 can use a function such as a loss function to evaluate a condition for determining whether the decoder 106 is configured (sufficiently) to meet the target performance metric. The condition can be a convergence condition, such as a condition that is satisfied responsive to factors such as an output of the function meeting the target performance metric or threshold, a number of training iterations, training of the decoder 106 converging, or various combinations thereof.

The diffusion-based image super-resolution model 120 can include one or more neural networks. A neural network can include an input layer, an output layer, and/or one or more intermediate layers, such as hidden layers, which can each have respective nodes. The diffusion-based image super-resolution model 120 can include various neural network models, including models that are effective for operating on images. The diffusion-based image super-resolution model 120 can spatially up-sample low-resolution images into high-resolution images. The diffusion-based image super-resolution model 120 can include a denoising neural network 132.

The training system 100 can convert the diffusion-based image super-resolution model 120 into the diffusion-based video super-resolution model 130 (e.g., the video diffusion up-sampler model). That is, the training system 100 can construct, establish, or otherwise arrive at the diffusion-based video super-resolution model 130 based on the diffusion-based image super-resolution model 120. The diffusion-based video super-resolution model 130 can include one or more neural networks. A neural network can include an input layer, an output layer, and/or one or more intermediate layers, such as hidden layers, which can each have respective nodes. The diffusion-based video super-resolution model 130 can include various neural network models, including models that are effective for operating on a sequence of images or frames of a video. The diffusion-based video super-resolution model 130 can be updated to spatially up-sample the video data (e.g., the images or frames of a video) outputted by the video diffusion model 110 into a high-spatial resolution video in a temporally consistent manner. The diffusion-based video super-resolution model 130 can include the denoising neural network 134.

In some examples, the training system 100 inserts at least one temporal attention neural network layer 134 into the at least one denoising neural network 132, which is part of the diffusion-based image super-resolution model 120. The diffusion-based video super-resolution model 130 can be the diffusion-based image super-resolution model 120 with the least one temporal attention neural network layer 134 inserted into the at least one denoising neural network 132 and updated in the manner described.

The training system 100 can train the at least one temporal attention neural network layer 134 by modifying or updating one or more parameters, such as weights and/or biases, of various nodes of the neural network responsive to evaluating candidate outputs of the at least one temporal attention neural network layer 134. The output of the at least one temporal attention neural network layer 134 can be used to evaluate whether the at least one temporal attention neural network layer 134 has been trained/updated sufficiently to satisfy a target performance metric, such as a metric indicative of accuracy of the at least one temporal attention neural network layer 134 in generating outputs. Such evaluation can be performed based on various types of loss. For example, the training system 100 can use a function such as a loss function to evaluate a condition for determining whether the at least one temporal attention neural network layer 134 is configured (sufficiently) to meet the target performance metric. The condition can be a convergence condition, such as a condition that is satisfied responsive to factors such as an output of the function meeting the target performance metric or threshold, a number of training iterations, training of the at least one temporal attention neural network layer 134 converging, or various combinations thereof.

The application system 150 can operate or deploy a model 160 and a model 170 to generate or provide output response 175 corresponding to high-spatial resolution, high-temporal resolution (e.g., high frame rate or FPS), long videos. The application system 150 can be implemented by or communicatively coupled with the training system 100, or can be separate from the training system 100. The model 160 can be or be received as the video diffusion model 110, a portion thereof, or a representation thereof. For example, a data structure representing the video diffusion model 110 can be used by the application system 150 as the model 160. The data structure can represent parameters of the trained or updated video diffusion model 110, such as weights or biases used to configure the model 160 based on the training or updating of the video diffusion model 110.

The model 170 can be or be received as the diffusion-based video super-resolution model 130, a portion thereof, or a representation thereof. For example, a data structure representing the video diffusion model 110 can be used by the application system 150 as the model 160. The data structure can represent parameters of the trained or updated video diffusion model 110, such as weights or biases used to configure the model 160 based on the training or updating of the video diffusion model 110.

The model 160 can generate a video 165. The video 165 can be an initial low-spatial-resolution video (referred to as the first video) that is spatially up-sampled by the model 170 in the manner described herein. In some examples, the model 160 (and the video diffusion model 110) can generate a low-spatial-resolution video, e.g., with low frame rate, or low FPS (referred to as the third video), which can be temporally up-sampled to generate the first video (the video 165). The first video has higher temporal resolution as compared to the third video. The first video may have the same spatial resolution as compared to the third video. The model 170 can receive the video 165 as input and can generate as an output a high-spatial resolution, high-temporal resolution (e.g., high frame rate or high FPS), long video, referred to as the second video.

Figure 2:
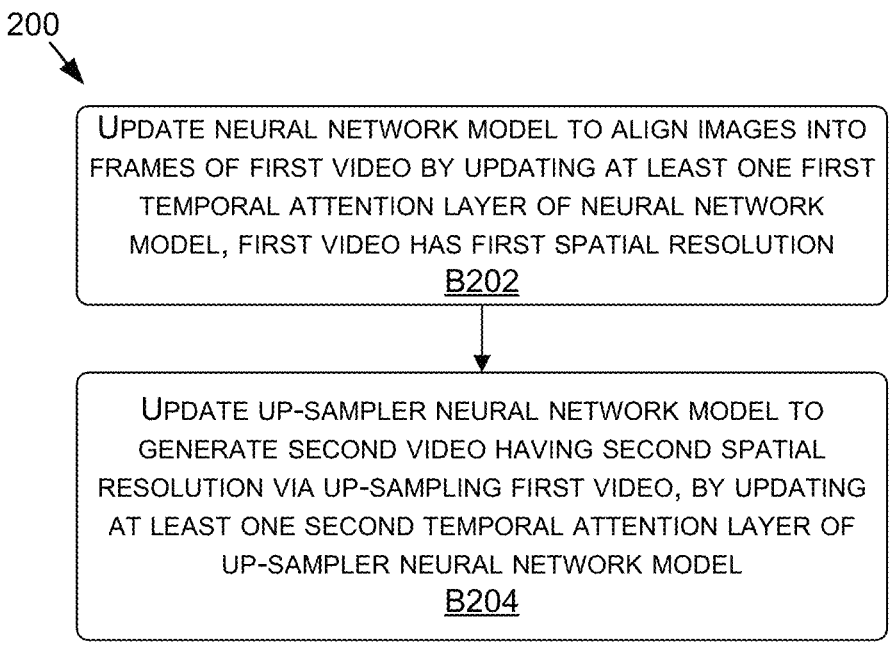
FIG. 2 is a block diagram of an example of a training method 200 for machine learning models.

FIG. 2 is a block diagram of an example of a training method 200 for machine learning models (e.g., the video diffusion model 110 and the diffusion-based video super-resolution model 130). Each block of the method 200, described herein, can include one or more types of data or one or more types of computing processes that may be performed using any combination of hardware, firmware, and/or software. For instance, various functions may be carried out by a processor executing instructions stored in memory. The method 200 may also be embodied as computer-usable instructions stored on computer storage media. The method 200 may be provided by a standalone application, a service or hosted service (standalone or in combination with another hosted service), or a plug-in to another product, to name a few. In addition, the method 200 is described, by way of example, with respect to the systems of FIG. 1. However, these methods may additionally or alternatively be executed by any one system, or any combination of systems, including, but not limited to, those described herein.

At B202, the training system 100 updates a neural network model (e.g., the video diffusion model 110) by aligning a plurality of images into frames of the first video by updating (e.g., training) at least one first temporal attention layer (e.g., the at least one temporal attention layer 114). The first video has a first spatial resolution. In some examples, the plurality of images are consecutive frames of the first video. In some examples, the neural network model includes an LDM having at least the encoder 104 and the decoder 106. The encoder 104 can map an input (e.g., an image) from an image space to a latent space. The decoder 106 can map latent encoding from the latent space back to the image space.

In some examples, the neural network model is constructed from a pre-trained, fixed image generation model. In some embodiments, the training system 100 inserts or otherwise adds at least one temporal attention layer 114 into the denoising neural network 112 of the image diffusion model 102 to construct the video diffusion model 110. The at least one temporal attention layer 114 can be updated to align the plurality of images into frames of the first video.

Figure 3:
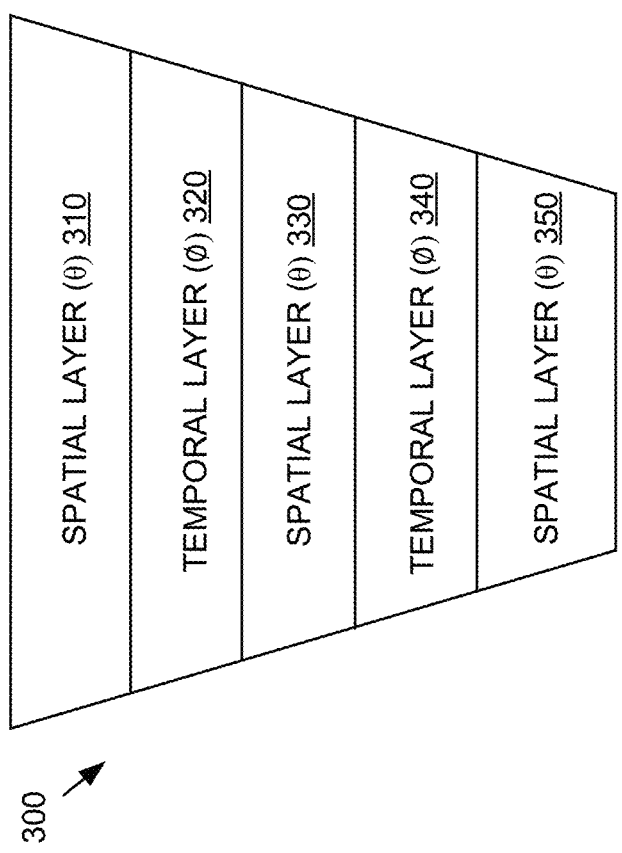
FIG. 3 is a diagram illustrating a model having temporal layers and spatial layers.

FIG. 3 is a diagram illustrating a model 300. The model 300 is an example of the video diffusion model 110. The image diffusion model 102 (e.g., the image LDM) can be parameterized by parameters θ. The image diffusion model 102 can include neural network layers 310, 320, 330, 340, and 350 that include the image LDM and process inputs over the pixel dimensions as spatial layers $l_\theta^i$ (e.g., spatial layers 310, 330, and 350), where i denotes a layer index. To imbue/incorporate temporal awareness in synthesizing individual frames (e.g., T consecutive frames) to render a video, the at least one temporal attention neural network layer 114, $l_\varnothing^i$, such as the temporal layers 320 and 340 is inserted into the at least one denoising neural network 112 by interleaving with the existing spatial layers $l_\theta^i$ (e.g., the spatial layers 310, 330, and 350).

The training system 100 updates or trains the at least one temporal attention neural network layer 114 (e.g., temporal layers 320 and 340) to align individual frames in a temporally consistent manner. In some examples, the number of temporal attention neural network layer 114 can be referred to as L. In the example of FIG. 3, L is 2. The set of at least one temporal attention neural network layer 114 (e.g., temporal layers 320 and 340) can be referred to as $\{l_\varnothing^i\}_{i=1}^L$ which can define the video-aware temporal backbone of the video diffusion model 110. For example, temporal layer 320 can be referred to as $l_\varnothing^i$, and temporal layer 340 can be referred to as $l_\varnothing^{i+1}$. The image diffusion model 102 can be defined by $f_\theta$. The video diffusion model 110 can be defined by $f_{\theta,\phi}$ which is the combination of the image backbone and the video-aware temporal backbone (e.g., the combination of the spatial layers and temporal layers).

For example, a frame-wise encoded input video ε(x) (e.g., the video data) can be defined by:

$$\varepsilon(x)=z\in \mathbb{R}^{C\times T\times H\times W} \quad (2),$$

where C is the number of latent channels, and H and W are the spatial latent dimensions, height and width, respectively. The spatial layers 310, 330, and 350 can interpret the input video as a batch of independent images (e.g., by shifting the temporal axis into the batch dimension), and each temporal mixing layer $l_\varnothing^i$ (e.g., the temporal layers 320 and 340) can be reshaped back to video dimensions, for example, using einops notation:

$$z' \leftarrow \text{rearrange}(z,(b\ t)c\ h\ w \rightarrow b\ c\ t\ h\ w) \quad (3),$$

$$z' \leftarrow l_\varnothing^i(z',c) \quad (4),$$

$$z' \leftarrow \text{rearrange}(z,b\ c\ t\ h\ w \rightarrow (b\ t)c\ h\ w) \quad (5),$$

where a batch dimension b can be added. The spatial layers 310, 330, and 340 can treat all B·T encoded video frames independently in the batch dimension b, while the temporal layers $l_\varnothing^i(z', c)$ can process entire videos in a new temporal dimension t. In some examples, c is the conditioning information such as text prompts, bounding boxes, and/or conditioning signals. After each temporal layer 320 or 340, the output z' can be combined with z, for example as:

$$\alpha_\phi^i z + (1-\alpha_\phi^i)z' \quad (6),$$

where $\alpha_\phi^i$ denotes a learnable parameter.

In some embodiments, two different kinds of temporal mixing layers, including a temporal attention and residual blocks based on 3D convolutions can be implemented. Sinusoidal embeddings can provide the model 300 with a positional encoding for time. The video-aware temporal backbone including the temporal layers 320 and 340 can then be updated/trained using the same noise schedule as the underlying image diffusion model 102. The spatial layers $l_\theta^i$ such as the spatial layers 310, 330, and 350 can be fixed during updating the at least one temporal attention layer $l_\varnothing^i$ such as the temporal layers 320 and 340, at B202. That is, in constructing the video diffusion model 110 from the image diffusion model 102, the at least one temporal attention layer 114 (e.g., the temporal layers 320 and 340) may be updated by the training system 100 using at least one sample sequence of images (e.g., the video data 116) while maintaining parameters of the at least one spatial layer (e.g., the spatial layers 310, 330, and 350) unchanged. The temporal layers $l_\varnothing^i$ can be optimized, updated, or trained using, for instance:

$$\arg\min \mathbb{E}_{x \sim p_{data}, \tau \sim p_\tau, \in \sim N(0,I)}[\|y - f_{\theta,\phi}(z_\tau; c, \tau)\|_2^2] \quad (7),$$

Where $z_\tau$ denotes diffused encodings $z = \varepsilon(x)$. Accordingly, the native image generation capabilities can be retained by simply skipping the temporal blocks, e.g., by setting $\alpha_\phi^i = 1$ for each layer (e.g., each of the temporal layers 320 and 340). Therefore, the image data 108 (e.g., image datasets having larger sizes) can be used to pre-train the spatial layers 310, 330, and 350 while the video data 116, which is often less widely available, can be used for focused training or fine-tuning of the temporal layers 320 and 340.

Figure 4:
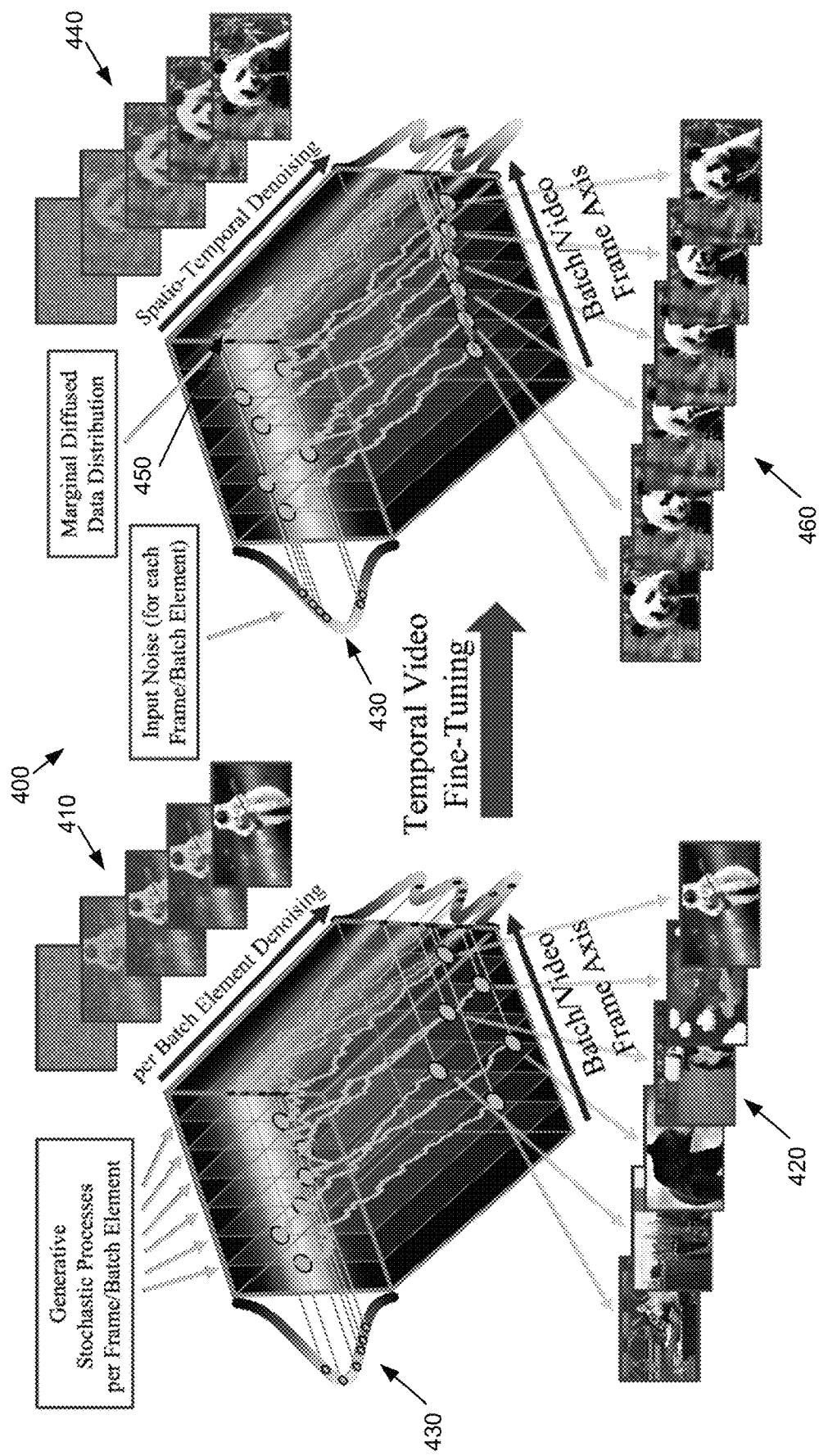
FIG. 4 is a diagram illustrating a temporal video fine-tuning method in which a pre-trained image diffusion model is constructed into a temporally consistent video generator such as a video diffusion model.

FIG. 4 is a diagram illustrating a temporal video fine-tuning method 400 in which a pre-trained image diffusion model 102 is constructed into temporally consistent video generator(s) such as the video diffusion model 110. FIG. 4 illustrates the temporal video fine-tuning (e.g., stochastic generation processes before and after fine-tuning) by showing pixel space diffusion for clarity, although as described herein, aligning the images into frames of a video for temporal consistency can be performed in the latent space, where the video is obtained after applying the decoder 106. Before temporal video fine-tuning, generative stochastic processes per frame or per batch element across the batch/video frame axis (which includes per batch element denoising 410) can be performed on an image or a frame where such image is denoised over a period of time based on an input noise 430 for each frame or batch element. Different samples 420 of a batch synthesized by the image diffusion model 102 are independent as shown, and may not be frames of a video. Temporal video fine-tuning of the at least one temporal attention neural network layer 114 can be performed. After temporal video fine-tuning, generative stochastic processes per frame or per batch element across the batch/video frame axis includes spatio-temporal denoising 440 on an image or a frame where such image can be denoised over a period of time based on an input noise distribution 430 for input noise each frame or batch element and diffused data distribution 450 (e.g., the marginal diffused data distribution). The resulting samples 460 along the batch/video frame axis are temporally aligned and can form a temporally coherent video.

In some embodiments, the training system can update/train the decoder 106 according to temporal incoherencies in mapping the latent encoding from the latent space to the image space. Given that the image diffusion model 102 is trained using only the image data 108, flickering artifacts may occur in encoding and decoding a temporally coherence sequence of images. To address such issues, additional temporal attention layers can be inserted into the decoder 106. These temporal attention layers of the decoder 106 can be fine-tuned by the training system 100 using the video data 116 using a patch-wise temporal discriminator built using 2D convolutions. The encoder 104 may remain unchanged from the image training (e.g., unchanged from the image diffusion model 102). That is, the image diffusion model 102 operating in latent space on encoded video frames can be implemented in the video diffusion model 110.

Figure 5:
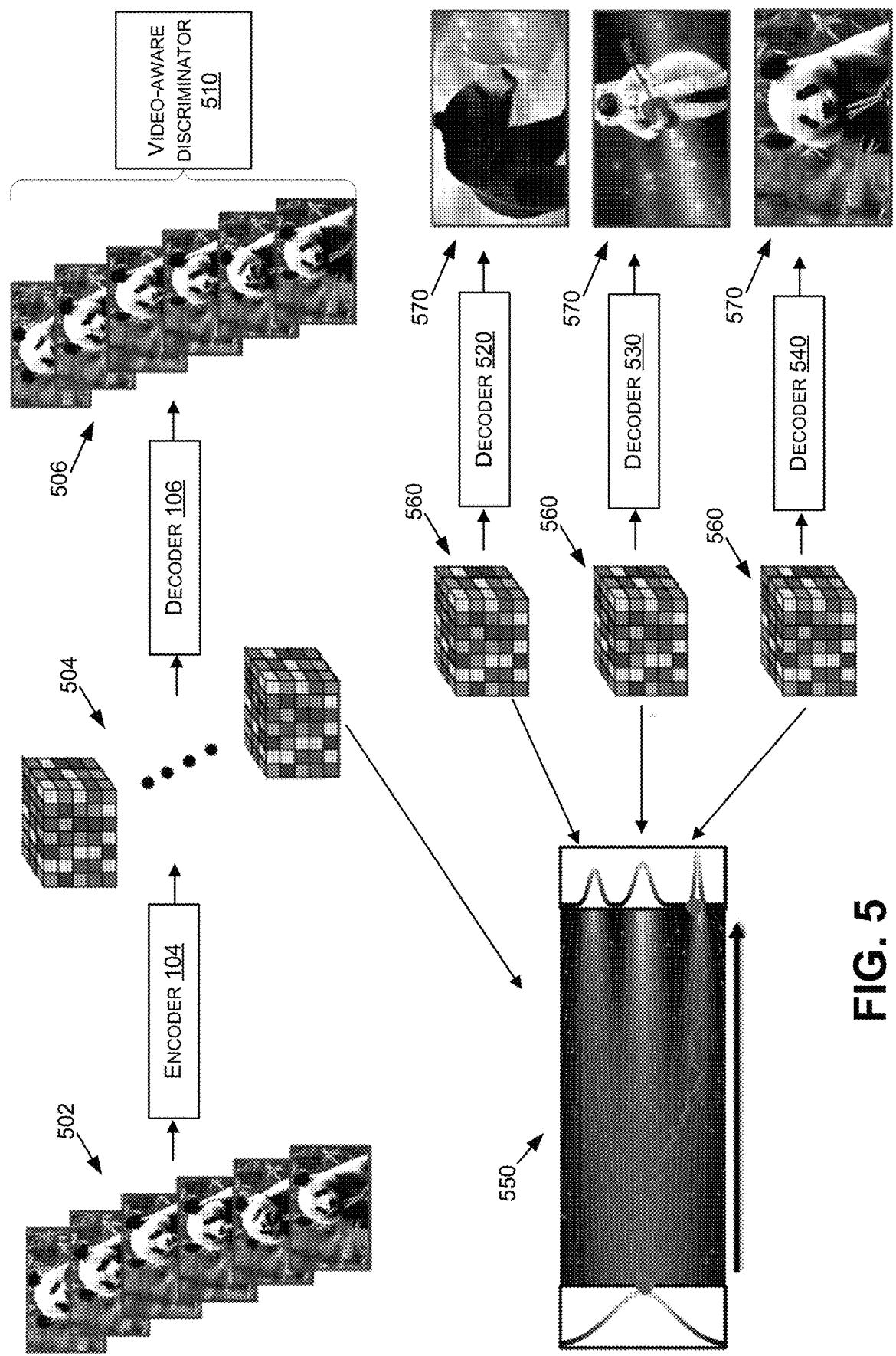
FIG. 5 is a diagram illustrating temporal decoder fine-tuning.

FIG. 5 is a diagram illustrating temporal decoder fine-tuning. During temporal decoder fine-tuning, a video sequence 502 (e.g., frames or images of a video) is processed by the encoder 104 which is frozen. That is, the encoder 104 processes the frames of the video sequence 502 independently. The encoder 104 can compress each frame of the video sequence 502 and can map that frame from an image space to a lower dimensional, compressed latent space (e.g., latent encoding, tensors, features, or representations 504). The decoder 106 can enforce temporally coherent reconstructions across frames by applying the latent representations 504 corresponding to the frames as input and outputting frames that are aligned as frames 506 of a video having temporal coherence. The video-aware discriminator 510 can be built from 3D convolutions to fine-tune the output frames 506.

As described, a diffusion model is trained in latent space and synthesizes latent representations 504, which are then transformed through the decoder 106 into images or frames 506. For example, the decoders 520, 530, and 540 can map respective ones of the latent encoding, tensors, features, or representations 560 back to the image space (e.g., to respective ones of the images 570). The latent representations 504 and 560 can be used in a generative denoising process 550. The latent representation 504 can be applied in the generative denoising process in which latent embedding distribution modeled with diffusion model is conditioned on at least one of text prompts, bounding boxes, or conditioning signals. In some examples, the training system 100 can update or train the video diffusion model 110 to generate the first video according to at least one of text prompts, bounding boxes, or conditioning signals.

In some examples, the video diffusion model 110 includes one diffusion model that is updated to first generate a third video and then generate the first video using the third video by temporally up-sampling (e.g., frame interpolating) the third video. The first video can be generated using the third video by generating at least one frame between two consecutive frames of the third video according to relative time step embedding. In some examples, the video diffusion model 110 includes a first diffusion model (e.g., a key frame LDM) and a second diffusion model (e.g., an interpolation LDM). The first diffusion model can be updated or trained to generate a third video (e.g., a video having spare key frames). The second diffusion model can be updated or trained to generate the first video using the third video by temporally up-sampling (e.g., frame interpolating) the third video. The first video can be generated using the third video by generating at least one frame between two consecutive frames of the third video according to relative time step embedding.

High-resolution video may be characterized not only by high spatial resolution, but also by high temporal resolution, e.g., a high frame rate or high FPS. In some examples, the third video can be generated by the video diffusion model 110 and can include key frames with large semantic changes at a relatively low temporal resolution. Subsequently, the video diffusion model 110 can interpolate between key frames of the third video to generate the first video.

In some embodiments, the frames to be interpolated are masked. The image diffusion model 102 is refined into the video diffusion model 110 having video interpolation capabilities. The video diffusion model 110 can be updated/trained to predict three frames between two given key frames based on masking, thus training/implementing a T→4T interpolation model. To achieve even larger frame rates, video diffusion model 110 can be simultaneously trained in the T→4T interpolation model and 4T→16T interpolation model, specified by binary conditioning. That is, the video diffusion model 110 can be trained to predict 12 frames between two given key frames based on masking.

At B204, the training system 100 updates an up-sampler neural network model (e.g., the diffusion-based video super-resolution model 130) to generate a second video having a second spatial resolution, where the second spatial resolution is higher than the first spatial resolution. The up-sampler neural network model can be fine-tuned by aligning directly in pixel space. The second video can be up-sampled to the megapixel range (e.g., 512×1024 spatial resolution). The video diffusion model 110 and the diffusion-based video super-resolution model 130 can form cascaded diffusion models. The diffusion-based video super-resolution model 130 may be a pixel-space diffusion model that can scale up the outputs of the video diffusion model 110.

In some examples, noise-augmentation with conditioning on the noise level can be used to train the diffusion-based video super-resolution model 130 directly on images via:

$$\mathbb{E}_{x \sim p_{data}, (\tau, \tau_\gamma) \sim p_\tau, \epsilon \sim \mathcal{N}(0, I)}[\|y - f_\theta(x_\tau; c_{\tau_\gamma}, \tau_\gamma, \tau)\|_2^2] \quad (8),$$

where $c_{\tau_\gamma} = \alpha_{\tau_\gamma} + \sigma_{\tau_\gamma} \epsilon$, $\epsilon \sim \mathcal{N}(0, I)$, denotes a noisy low-spatial resolution image applied as input to the diffusion-based video super-resolution model 130 via concatenation. $\tau_\gamma$ denotes the amount of noise added to the low-spatial resolution image following the noise schedule $\alpha_\tau$, $\sigma_\tau$.

Given that up-sampling video frames independently would result in poor temporal consistency, the diffusion-based video super-resolution model 130 can be configured to be video-aware.

The diffusion-based image super-resolution model 120 (e.g., an image LDM) can be parameterized by parameters θ. The diffusion-based image super-resolution model 120 can likewise include neural network layers 310, 320, 330, 340, and 350 that include the image LDM and process inputs over the pixel dimensions as spatial layers $l_\theta^i$ (e.g., spatial layers 310, 330, and 350), where i denotes a layer index. To imbue temporal awareness in up-sampling individual frames (e.g., T consecutive frames) in terms of spatial resolution, the at least one temporal attention neural network layer 134 including the temporal layers 320 and 340 is inserted into the at least one denoising neural network 132 by interleaving with the existing spatial layers $l_\theta^i$ (e.g., the spatial layers 310, 330, and 350).

The training system 100 updates or trains the at least one temporal attention neural network layer 134 (e.g., temporal layers 320 and 340) to up-sample individual frames in terms of spatial resolution in a temporally consistent manner. In some examples, the number of temporal attention neural network layer 134 can be referred to as L. In FIG. 3, L is 2. The set of at least one temporal attention neural network layer 134 (e.g., temporal layers 320 and 340) can be referred to as $\{l_\varnothing^i\}_{i=1}^L$ which can define the video-aware temporal backbone of the diffusion-based video super-resolution model 130. For example, temporal layer 320 can be referred to as $l_\varnothing^i$, and temporal layer 320 can be referred to as $l_\varnothing^{i+1}$. The diffusion-based image super-resolution model 120 can be defined by $f_\theta$. The diffusion-based video super-resolution model 130 can be defined by $f_{\theta, \phi}$ which can be the combination of the image backbone and the video-aware temporal backbone (e.g., the combination of the spatial layers and temporal layers).

For example, a frame-wise encoded input video ε(x) (e.g., the video data) can be defined by expression (2). The spatial layers 310, 330, and 350 can interpret the input video as a batch of independent images (e.g., by shifting the temporal axis into the batch dimension), and each temporal mixing layer $l_\varnothing^i$ (e.g., the temporal layers 320 and 340) can be reshaped back to video dimensions, for example, using expressions (3), (4), and (5). The spatial layers 310, 330, and 340 can treat all B·T encoded video frames independently in the batch dimension b, while the temporal layers $l_\varnothing^i(z', c)$ can process entire videos in a new temporal dimension t. In some examples, c is the conditioning information such as text prompts, bounding boxes, or conditioning signals. After each temporal layer 320 or 340, the output z' is combined with z as expression (6).

In some embodiments, two different kinds of temporal mixing layers, including a temporal attention and residual blocks based on 3D convolutions can be implemented. Sinusoidal embeddings can provide the model 300 (e.g., an example of the diffusion-based video super-resolution model 130) with a positional encoding for time. The video-aware temporal backbone including the temporal layers 320 and 340 can then be trained using the same noise schedule as the underlying diffusion-based image super-resolution model 120. The spatial layers $l_\theta^i$ such as the spatial layers 310, 330, and 350 can be fixed during updating the at least one temporal attention layer $l_\varnothing^i$ such as the temporal layers 320 and 340, at B204. That is, in constructing the diffusion-based video super-resolution model 130 from the diffusion-based image super-resolution model 120, the at least one temporal attention layer 134 (e.g., the temporal layers 320 and 340) may be updated by the training system 100 using at least one sample sequence of images (e.g., the video data 116) while maintaining parameters of the at least one spatial layer (e.g., the spatial layers 310, 330, and 350) unchanged. The temporal layers $l_\varnothing^i$ can be optimized, updated, or trained using expression (7).

Accordingly, the native image generation capabilities can be retained by simply skipping the temporal blocks, e.g., by setting the learned mixing factor $\alpha_\phi^i = 1$ for each layer (e.g., each of the temporal layers 320 and 340).

The diffusion-based video super-resolution model 130 can be video fine-tuned, conditioning on a low-resolution sequence of length T and concatenating low-resolution video images frame-by-frame. Given that the diffusion-based video super-resolution model 130 operates only locally, all training for the diffusion-based video super-resolution model 130 can be efficiently performed on patches only. The diffusion-based video super-resolution model can be later applied convolutionally.

In some examples, the image diffusion model 102 and the diffusion-based image super-resolution model 120 can be referred to as image LDMs (e.g., Stable Diffusion LDMs), each one which can include a backbone such as a Unet-backbone. The video diffusion model 110 and the diffusion-based video super-resolution model 130 can be referred to as video LDMs. The image LDMs can generalize to spatial resolutions considerably larger than the ones on which the image LDMs are trained by increasing the spatial size of the sampled noise and leveraging the convolutional nature of the Unet-backbone. In some embodiments, a Stable Diffusion LDM can be used as fixed generative image backbone for the text-to-video model, the video LDMs naturally preserve such properties, thus enabling the increase of the spatial resolution at inference time without any loss of image quality. For example, videos generated using the video LDMs in the manner described herein can have a spatial resolution 512×512 if convolutional sampling "in space" is applied even though the video LDMs are trained on resolution 320×512.

The video LDMs can be applied convolutionally in time and convolutionally in space to enable long-term or high-resolution video generation without training specific temporal prediction or spatial up-sampling models for these tasks. Furthermore, convolutional sampling can be applied to the temporal dimension to generate videos considerably longer than videos on which the video LDMs are trained. For example, relative sinusoidal positional encodings for the temporal attention neural network layers 114 and 134 similar to those used to encode the time steps in the Unet-backbone. The learned mixing factor $\alpha_\phi^i$ is parameterized with scalars for the text-to-video model. The video LDMs can generate longer sequences by increasing the number of frames for the model to render. Furthermore, convolutional sampling in space and time can be combined, leading to high-resolutions videos of lengths up to 30 seconds despite of the video LDMs being trained on sequences each having a length of 4 second.

In some embodiments, to generate long or very long videos, one or more neural network models described herein can be trained as prediction models for a number of S context frames. A temporal binary mask $m_S$ can mask T-S frames that the model is to predict, where T is the total sequence length. This mask and the masked encoded video frames can be fed into the model for conditioning. In some examples, the frames are encoded with the image diffusion model 102's encoder 104, multiplied by the mask, and then fed (channel-wise concatenated with the masks) into the temporal attention layer $l_\varnothing^i$ after being processed with a learned down-sampling operation.

In the examples in which $C_S = (m_S \circ z, m_S)$ denotes a concatenated spatial conditioning of masks and masked encoded images, the temporal layers $l_\varnothing^i$ can be optimized, updated, or trained using objective:

$$\mathbb{E}_{x \sim p_{data}, m_S \sim p_S, \tau \sim p_\tau, \epsilon} [\|y - f_{\theta, \phi}(z_\tau; c_S, c, \tau)\|_2^2] \quad (8)$$

where $p_S$ represents the categorical mask sampling distribution. In some examples, prediction models that condition either on 0, 1, or 2 context frames are learned, allowing for classifier-free guidance.

During inference, for generating long videos, the sampling process can be iteratively applied and the latest predictions can be re-used as new context. The first initial sequence can be generated by synthesizing a single context frame from the image diffusion model 102. A sequence of frames can be generated by the video diffusion model 110 based on the first initial sequence. Thereafter, two context frames can be conditioned to encode movement. To stabilize this process, a classifier-free diffusion guidance can guide the video diffusion model 110 during sampling via:

$$f'_{\theta,\phi}(z_\tau; c_S) = f_{\theta,\phi}(z_\tau) + s \cdot (f_{\theta,\phi}(z_\tau; c_S) - f_{\theta,\phi}(z_\tau)) \quad (9),$$

where $s \geq 1$ denotes the guidance scale. The explicit conditioning on $\tau$ and other information c may be omitted for the sake of clarity. Such guidance is used as the context guidance. Accordingly, in some examples, the training system 100 can update or train the video diffusion model 110 to generate the first video according to modified conditioning signals for classifier-free guidance. That is, classifier-free guidance is a test-time technique used in sampling from the video diffusion model 110. In some examples, in order to use classifier-free guidance at test time, the conditioning signals are modified (e.g., periodically dropping out or omitting some conditioning information such as the text labels) during training. Accordingly, the training system 100 simultaneously learn a conditional and an un-conditional video diffusion model 110 by combining at test-time/generation time using classifier-free guidance.

Figure 6:
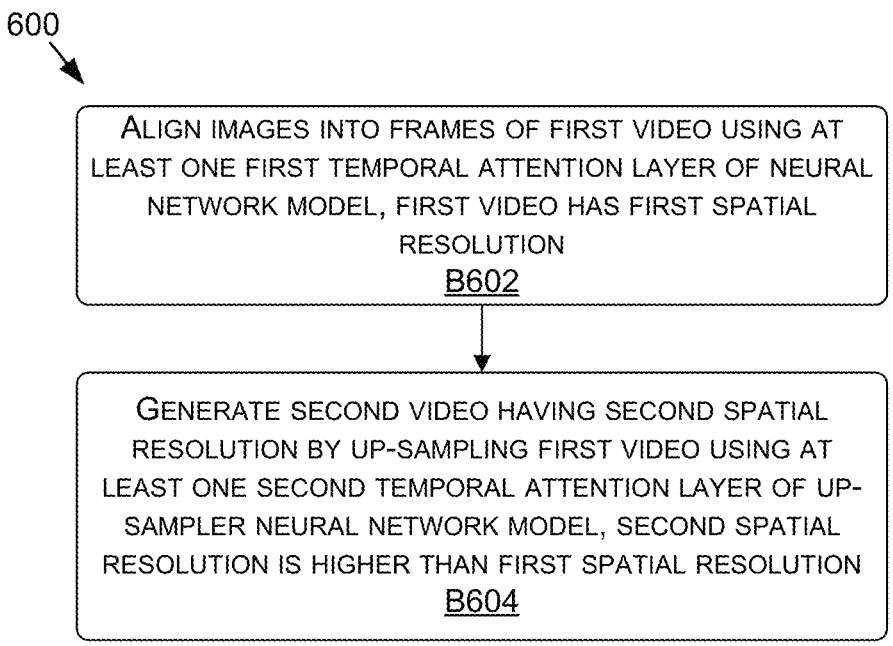
FIG. 6 is a block diagram of an example of a method 600 for generating high-spatial-resolution videos.

FIG. 6 is a flow diagram of an example of a method 600 for generating high-spatial-resolution videos (e.g., using the video diffusion model 110 and the diffusion-based video super-resolution model 130). Each block of the method 600, described herein, can include one or more types of data or one or more types of computing processes that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, the method 600 is described, by way of example, with respect to the systems of FIG. 1. However, these methods may additionally or alternatively be executed by any one system, or any combination of systems, including, but not limited to, those described herein.

At 602, and in some embodiments, the model 160 (e.g., the video diffusion model 110) aligns a plurality of images into frames of a first video (e.g., the video 165) using at least one first temporal attention layer 114 of a neural network model (e.g., the video diffusion model 110). The first video can have a first spatial resolution.

At 604, and in some embodiments, the model 170 generates a second video (e.g., the output response 175) having a second spatial resolution by up-sampling the first video using at least one second temporal attention layer 134 of an up-sampler neural network model (e.g., the model 170 or the diffusion-based video super-resolution model 130). The second spatial resolution can be higher than the first spatial resolution.

The neural network model (e.g., the model 110 and 160) can be modified from an image diffusion model (e.g., the model 102) by adding the at least one first temporal attention layer 114 into the image diffusion model.

The image diffusion model 102 can include/be a LDM including the encoder 104 to map an input from an image space to a latent space, and the decoder 106 to map latent encoding from the latent space to the image space. The decoder may be updated according to temporal incoherencies in mapping the latent encoding from the latent space to the image space.

In some examples, the video diffusion model 110 includes a first diffusion model and a second diffusion model. The first diffusion model can be updated or trained to generate a third video. The second diffusion model can be updated or trained to generate the first video using the third video by temporally up-sampling (e.g., frame interpolating) the third video. The first video can be generated using the third video by generating at least one frame between two consecutive frames of the third video according to relative time step embedding. In some examples, the plurality of images are consecutive frames of the first video.

In some examples, the neural network model includes a first diffusion model and a second diffusion model. The first diffusion model may be implemented/used to generate a third video. The second diffusion model may be implemented/used to generate the first video by generating at least one frame between two consecutive frames of the third video. In some examples, the neural network model may be implemented/used to generate a third video and generate the first video by generating at least one frame between two consecutive frames of the third video according to relative time step embedding. In some examples, the first video is generated according to at least one of text prompts, bounding boxes, or conditioning signals.

Accordingly, the combination of the LDM (e.g., the video diffusion model 110) and a pixel-space up-sampler (e.g., the diffusion-based video super-resolution model 130) can improve efficiency for high-spatial-resolution and high-temporal-resolution video synthesis. On one hand, the video diffusion model 110 leverages a computationally efficient, compressed latent space to perform all video modeling. A large batch size can be used to jointly encode more video frames, which benefits long-term video modeling, without excessive memory demands, as all video predictions and interpolations are carried out in latent space. On the other hand, the diffusion-based video super-resolution model 130 can be trained in an efficient patch-wise manner, therefore similarly saving computational resources and reducing memory consumption. Long-term temporal correlations due to the low-resolution conditioning may not need to be captured. Therefore, no prediction and interpolation framework is needed.

Example Computing Device

Figure 7:
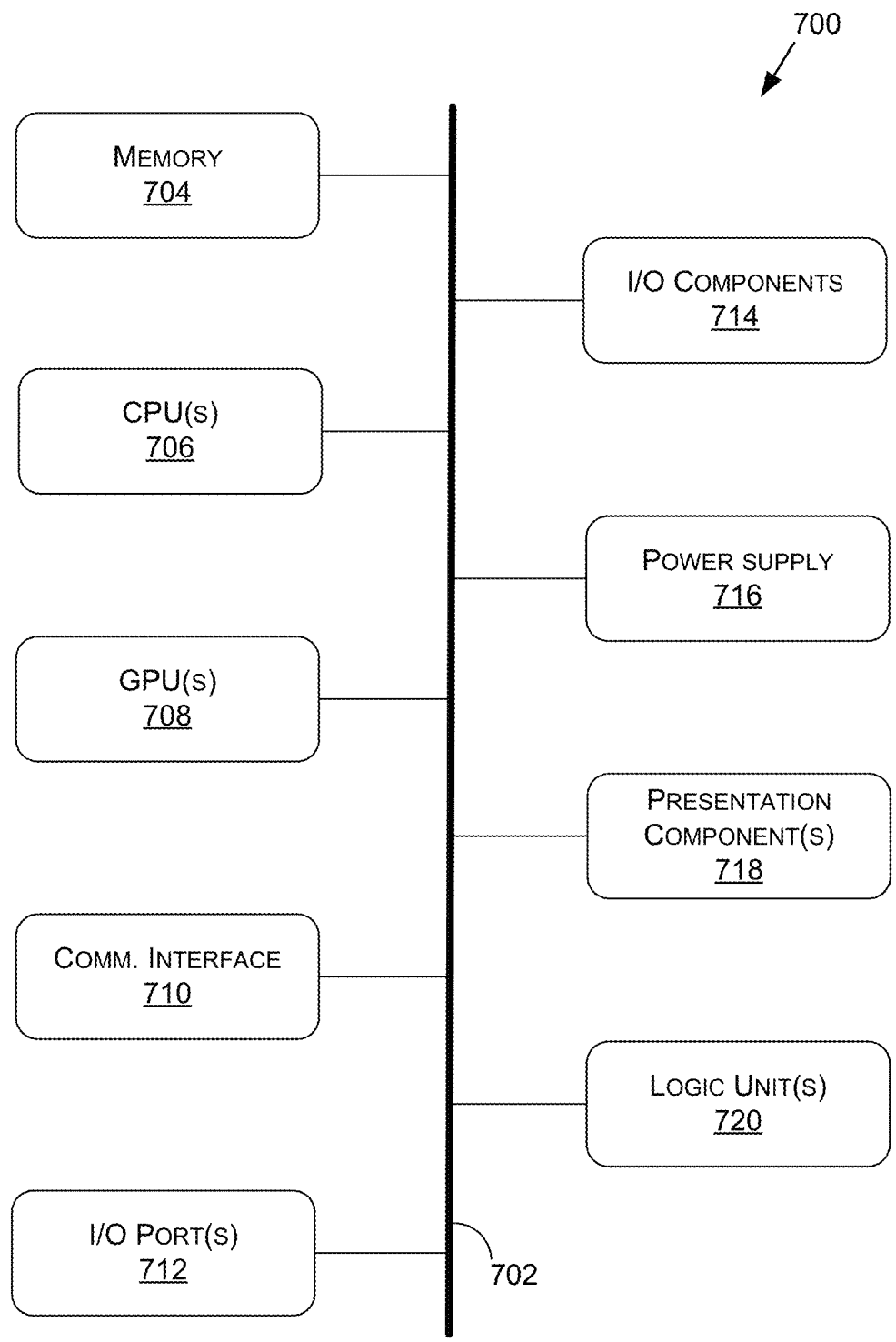
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. The computing device(s) 700 are example implementations of the training system 100 and/or the application system 150. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708. Examples of the logic unit(s) 720 include the image diffusion model 102, the video diffusion model 110, the diffusion-based image super-resolution model 120, the diffusion-based video super-resolution model 130, the training system 100, the application system 150, the model 160, the model 170, and so on.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The computing device 700 may be include depth cameras, such as stereoscopic camera systems, infrared camera systems, RGB camera systems, touchscreen technology, and combinations of these, for gesture detection and recognition. The I/O components 714 can include the camera 154 for generating images and videos. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
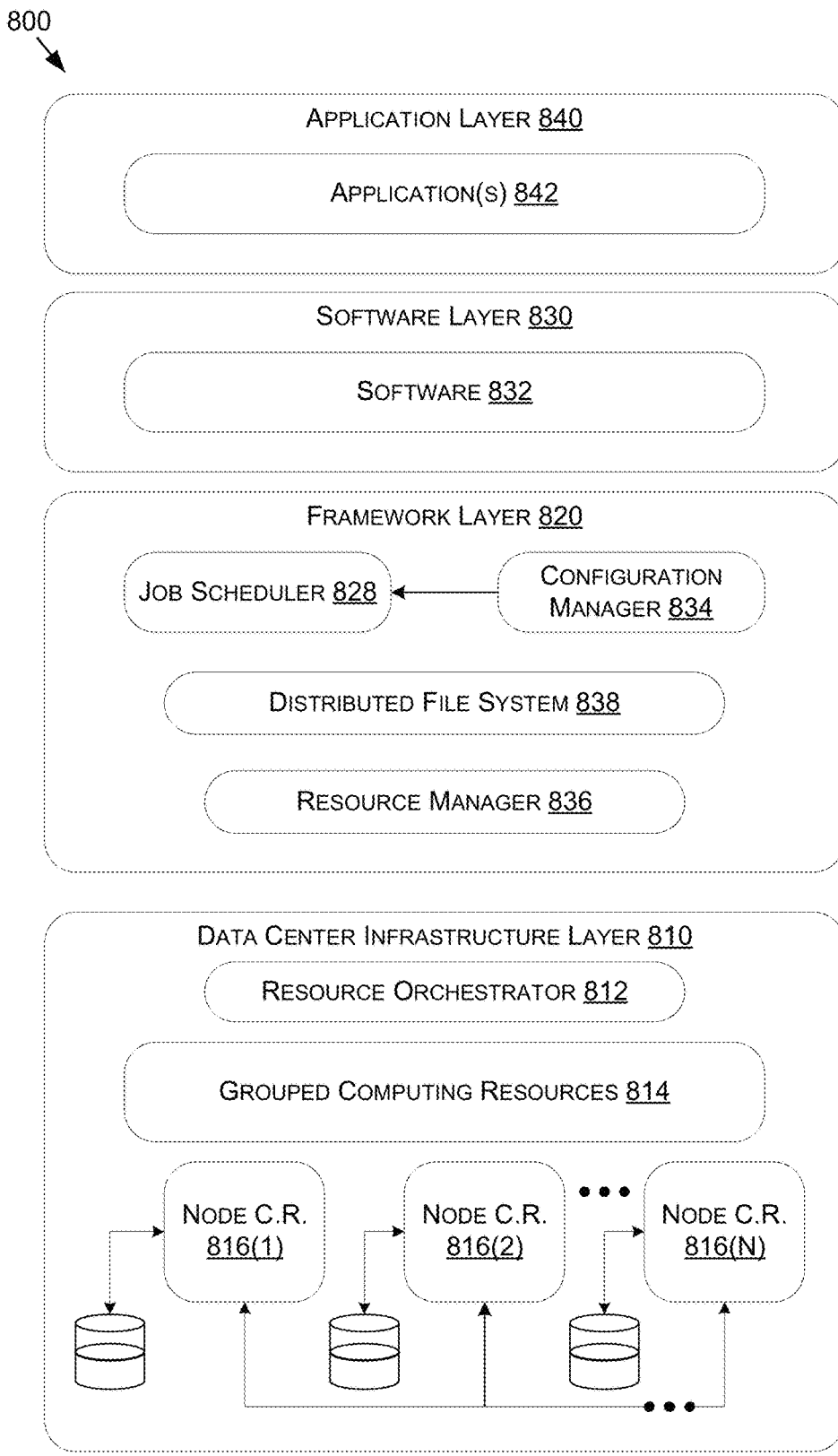
FIG. 8 is a block diagram of an example data center suitable for use in implementing some embodiments of the present disclosure.

FIG. 8 illustrates an example data center 800 that may be used in at least one embodiments of the present disclosure, such as to implement the training system 100 or the application system 150 in one or more examples of the data center 800. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-816(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 828, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark (hereinafter "Spark") that may utilize distributed file system 838 for large-scale data processing (e.g., "big data"). In at least one embodiment, job scheduler 828 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 828. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to perform training of the models described herein.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:
1. A processor, comprising:
one or more circuits to:
align a plurality of images into frames of a first video using a neural network model comprising a latent diffusion model (LDM), wherein the first video has a first spatial resolution, the LDM comprises:
an encoder to map an input from an image space to a latent space; and
a decoder to map latent encoding from the latent space to the image space; and
generate a second video having a second spatial resolution by up-sampling the first video using an up-sampler neural network model, wherein the second spatial resolution is higher than the first spatial resolution, wherein the decoder is updated according to one or more temporal incoherencies in mapping the latent encoding from the latent space to the image space.

2. The processor of claim 1, wherein the neural network model is modified from an image diffusion model by adding at least one first temporal attention layer into the image diffusion model.

3. The processor of claim 1, wherein the up-sampler neural network model comprises a first diffusion model for video generation, and the first diffusion model is modified from a second diffusion model for image generation by adding at least one second temporal attention layer into the first diffusion model for image generation.

4. The processor of claim 1, wherein the plurality of images are consecutive frames of the first video.

5. The processor of claim 1, wherein:
the neural network model comprises a first diffusion model and a second diffusion model;
the first diffusion model is to generate a third video; and
the second diffusion model is to generate the first video by generating at least one frame between two consecutive frames of the third video.

6. The processor of claim 1, wherein the neural network model is to:
generate a third video; and
generate the first video by generating at least one frame between two consecutive frames of the third video according to relative time step embedding.

7. The processor of claim 1, wherein the first video is generated according to at least one of:
one or more text prompts;
one or more bounding boxes; or
one or more conditioning signals.

8. A processor, comprising:
one or more circuits to:
update a neural network model to align a plurality of images into frames of a first video by updating at least one layer of the neural network model, wherein the first video has a first spatial resolution, wherein the neural network model comprises a Latent Diffusion Model (LDM) comprising:
an encoder to map an input from an image space to a latent space; and
a decoder to map latent encoding from the latent space to the image space,
wherein to update the neural network model, the one or more processing units are to update the decoder according to one or more temporal incoherencies in mapping the latent encoding from the latent space to the image space; and
update an up-sampler neural network model to generate a second video having a second spatial resolution via up-sampling the first video by updating at least one layer of the up-sampler neural network model, wherein the second spatial resolution is higher than the first spatial resolution.

9. The processor of claim 8, wherein the one or more circuits are to:
insert the at least one neural network layer into a denoising neural network of an image diffusion model; and
update the at least one neural network layer to align the plurality of images into the frames of the first video.

10. The processor of claim 8, wherein the one or more circuits are to:
update at least one other layer of the neural network model using a plurality of sample images; and
update the at least one layer using at least one sample sequence of images, while maintaining parameters of the at least one other layer unchanged.

11. The processor of claim 8, wherein the plurality of images are consecutive frames of the first video.

12. The processor of claim 8, wherein:
the neural network model comprises a first diffusion model and a second diffusion model;
the first diffusion model is updated to generate a third video; and
the second diffusion model is updated to generate the first video by generating at least one frame between two consecutive frames of the third video.

13. The processor of claim 8, wherein:
the neural network model is updated to generate a third video; and
the neural network model is updated to generate the first video by generating at least one frame between two consecutive frames of the third video according to relative time step embedding.

14. The processor of claim 8, wherein the one or more circuits are to update the neural network model to generate the first video according to at least one of:
one or more text prompts;
one or more bounding boxes; or
one or more conditioning signals.

15. The processor of claim 8, wherein the one or more circuits are to update the neural network model to generate the first video according to modified conditioning signals for classifier-free guidance.

16. A method, comprising:
updating a neural network model to align a plurality of images into frames of a first video by updating at least one first temporal attention layer of the neural network model, wherein the first video has a first spatial resolution, wherein the neural network model comprises a Latent Diffusion Model (LDM) comprising:
an encoder to map an input from an image space to a latent space; and
a decoder to map latent encoding from the latent space to the image space,
wherein updating the neural network model comprises updating the decoder according to one or more temporal incoherencies in mapping the latent encoding from the latent space to the image space; and
updating an up-sampler neural network model to generate a second video having a second spatial resolution via up-sampling the first video, by updating at least one second temporal attention layer of the up-sampler neural network model, wherein the second spatial resolution is higher than the first spatial resolution.

* * * * *